(12) United States Patent
Le et al.

(10) Patent No.: US 9,595,077 B1
(45) Date of Patent: Mar. 14, 2017

(54) HIGH PERFORMANCE DATA RENDERING

(71) Applicant: Workday, Inc., Pleasanton, CA (US)

(72) Inventors: Vu Le, Dublin, CA (US); Viswa Periyanan, San Ramon, CA (US); Steve Chui, Dublin, CA (US)

(73) Assignee: Workday, Inc., Pleasanton, CA (US)

( * ) Notice: Subject to any disclaimer, the term of this patent is extended or adjusted under 35 U.S.C. 154(b) by 10 days.

(21) Appl. No.: 14/579,665

(22) Filed: Dec. 22, 2014

Related U.S. Application Data

(60) Provisional application No. 61/923,681, filed on Jan. 5, 2014.

(51) Int. Cl.
*G06T 3/20* (2006.01)

(52) U.S. Cl.
CPC ...................... *G06T 3/20* (2013.01)

(58) Field of Classification Search
CPC ............... G01C 21/3676; G03B 35/16; H04N 13/0275; G06F 3/0485; G06F 1/1626; G06F 3/04855; G09G 5/346; G09G 5/14
See application file for complete search history.

(56) References Cited

U.S. PATENT DOCUMENTS

| | | | |
|---|---|---|---|
| 2006/0129933 A1* | 6/2006 | Land | G11B 27/034 715/723 |
| 2011/0202871 A1* | 8/2011 | Bair | G06F 3/04855 715/786 |
| 2012/0062576 A1* | 3/2012 | Rosenthal | G09G 5/14 345/522 |
| 2012/0159393 A1* | 6/2012 | Sethi | G06F 17/30902 715/830 |
| 2014/0258849 A1* | 9/2014 | Chung | G06F 17/212 715/243 |

* cited by examiner

*Primary Examiner* — Todd Buttram
(74) *Attorney, Agent, or Firm* — Van Pelt, Yi & James LLP

(57) ABSTRACT

Large data sets are shown efficiently on a digital screen. A data set list is split up into smaller chunks with each chunk containing a number of items. Only the chunks that are within the viewable screen area are shown. As a user indicates to move up and down displayed data on a display (e.g., using a scroll bar), more chunks are loaded and stitched together with the previously shown chunk(s).

20 Claims, 8 Drawing Sheets

HIGH PERFORMANCE DATA RENDERING

CROSS REFERENCE TO OTHER APPLICATIONS

This application claims priority to U.S. Provisional Patent Application No. 61/923,681 entitled HIGH PERFORMANCE DATA RENDERING IN A LIST filed Jan. 5, 2014 which is incorporated herein by reference for all purposes.

BACKGROUND OF THE INVENTION

Displaying a large data set uses considerable computing resources. As the data set gets larger, any machine will fail from overloading the computing resources, and even when the machine does not fail, performance is a concern.

BRIEF DESCRIPTION OF THE DRAWINGS

Various embodiments of the invention are disclosed in the following detailed description and the accompanying drawings.

DETAILED DESCRIPTION

Figure 1:
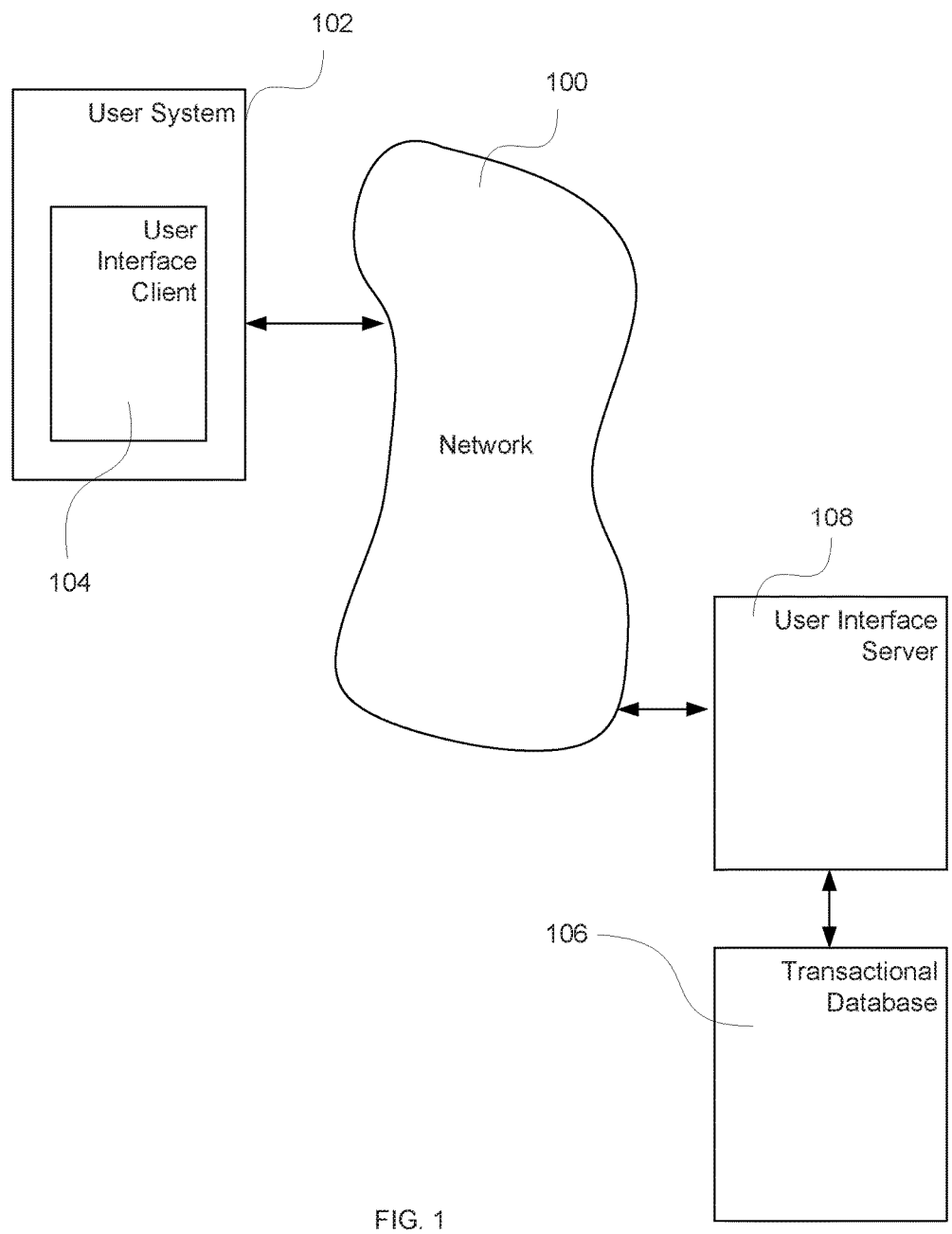
FIG. 1 is a diagram illustrating an embodiment of a system for causing a display of items in a display range.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for causing a display of items in a display range is disclosed. In some embodiments, the system comprises an input interface and a processor. The input interface is to receive a total number of items. The processor is to: determine a total data set height by multiplying the total number of items by an approximate item height; determine a total number of chunks by dividing the total number of items by a number of items per chunk; determine a starting position for each chunk using the total data set height and the total number of chunks; determine a display range for displaying items using the total data set height; determine a set of chunks needed to display the display range using the starting position for each chunk; and cause the displaying items associated with the display range to be displayed.

A system for causing a display of items in a display range is disclosed. In some embodiments, the system comprises a processor to display a data set by dividing the data set into chunks, each loaded in the event that a chunk is within a viewable area. The processor stores a starting position and a height for each chunk and updates a starting position for all chunks below an updated chunk, wherein the updated chunk has a height that is updated.

In some embodiments, large data sets are shown efficiently on a digital screen. A data set list is split up into smaller chunks with each chunk containing a number of items. Only the chunks that are within the viewable screen area will be shown. As a user indicates to move up and down displayed data on a display (e.g., using a scroll bar), more chunks are loaded and stitched together with the previously shown chunk(s).

In some embodiments, displaying a large data set uses considerable computing resources. As the data set gets larger, any machine will fail from overloading the computing resources, and even when the machine does not fail, performance is a concern. The disclosed system significantly reduces the time/resources it takes to render any large data set because only part of the data is rendered for viewing at any one time on the screen. The data set is divided into smaller chunk increments and computational resources are expended only to display the chunks as needed (e.g., as the user moves a given chunk's content into view). This minimizes the amount of content that needs loading into memory and rendering. In various embodiments, the memory comprises one or more of the following: system memory, semiconductor memory, magnetic disc memory, or any other appropriate memory. In the event that the chunks have been previously loaded but have not been used recently, the chunks are removed from memory. This conserves machine resources usage regardless of the size of the data set. In some embodiments, the disclosed technique uses two input parameters, the total number of items in the list and the approximate item height.

In some embodiments, given the total number of entries in a large data set, the data set can be broken into smaller chunk increments. For example, if it is given that there are 500 items in a data set and that each chunk is 50 items, the complete data set can be represented by 10 chunks. Given the large amount of data, modern computing screens normally have some mechanism to scroll through all the data.

In various embodiments, scrolling is achieved using one or more of: hand swipe (e.g., hand swipe up or down on a touch sensitive screen or touch pad), rotation of a physical knob, a scroll bar, buttons (e.g., up arrow or down arrow on scroll bar or on keyboard, page up or page down buttons on keyboard, etc.), or any other appropriate scrolling control. Without rendering all the items in the data set, the total height of the data set needs to be approximated for the scrolling mechanism. The approximated total data height can be derived by the given approximate item height multiplied by the total number of items. The approximate item height number can be a randomly chosen value, but the user experience is much improved if an accurate (but approximate) row or item height is provided to the system. As an example, let's say the approximate row height is 20 pixels and the total number of items is 500, then, the total data set height is 10,000 pixels (500 rows×20 pixel each). Initially, it is necessary to store in a memory the starting position and the height for each chunk. Using the approximate item height of 20 pixels and the number of items per chunk, the height of each chunk will be 1,000 pixels (50 rows×20 pixel). The first chunk has a starting pixel location of 0, second chunk starts at pixel 1,000, third chunk starts at pixel 2,000, and so on. These values are stored in memory and updated throughout a data viewing session. Before content is loaded, the height of the screen is needed. Relating to the example above, for a typical computer screen of 1024×768 (width×height) pixels, the screen cannot display an entire chunk (e.g., the first chunk, since the chunk is 1000 pixels tall). Therefore initially, the first chunk can be loaded while not loading any other chunks into memory (e.g., leaving the rest of the chunk data empty). Once the data in the loaded chunk has been rendered, the accurate height for this loaded chunk is known and the memory is updated as to the true (not approximate) height of the chunk. All the starting locations of the chunks below the updated chunk are also adjusted (the difference of the new (true) chunk height and the old (approximate) chunk height). For example, if the first chunk is loaded and only takes up 800 pixels instead of the approximate 1000 pixels, the second chunk's new starting pixel is 800, while third chunk's new starting pixel is 1800 (800 pixel for first chunk+1000 pixels for the second), and so on. The memory is constantly updated as the height of each chunk is determined from rendering the chunk after loading the chunk. As the user scrolls up and down, the starting and ending pixel of the screen are determined. Since the start and end of each chunk is known, the chunks that are within the visible area can be determined. The chunks visible on the screen are then loaded. Once the chunks are loaded and rendered, the memory is updated to reflect the chunks' locations. Consecutive chunks are stitched together with a previous chunk ending where a next chunk starts. A chunk can be loaded in any order, and any chunk can be removed from the memory so that the space resource can be reclaimed at any time. The starting position and height of each chunk are always kept up to date regardless of whether a chunk has been loaded.

In some embodiments, a technique to display a large data set quickly includes dividing the data into smaller chunks, each of which is loaded in the event that it is within the viewable area. The followings are needed to make this happen: each chunk has its starting position and height stored. Consecutive chunks are stitched together, where a first one starts immediately after a next one. Whenever a chunk's height is updated (e.g., when the items for the chunk have been loaded and rendered and an actual height is determined and is used to replace the approximate height), all the chunks below it are updated to reflect the respective new starting positions of the chunks. A chunk can be loaded in any order, and any chunk outside the viewable area can be removed at any time.

In some embodiments, a loaded chunk is removed once the user moves the viewable area away. In some embodiments, a constant number of chunks is maintained so performance is maintained without taking up all the resources In some embodiments, once a chunk is determined to be needed, a delay is put in to only load the chunk after a certain time (e.g., a delay time) has elapsed and the chunk has not moved outside the viewable area. This minimizes the performance impact which occurs when a user scrolls rapidly (e.g., from top to bottom). Without the delay, all the chunks may be loaded which would slow down the system.

FIG. 1 is a diagram illustrating an embodiment of a system for causing a display of items in a display range. In the example shown, user system 102 include user interface client 104. User system 102 is in communication with user interface server 108, which provides display data to user system 102 in response to requests from a user. Display data is requested via user interface server 108 from transaction database 106.

Figure 2A:
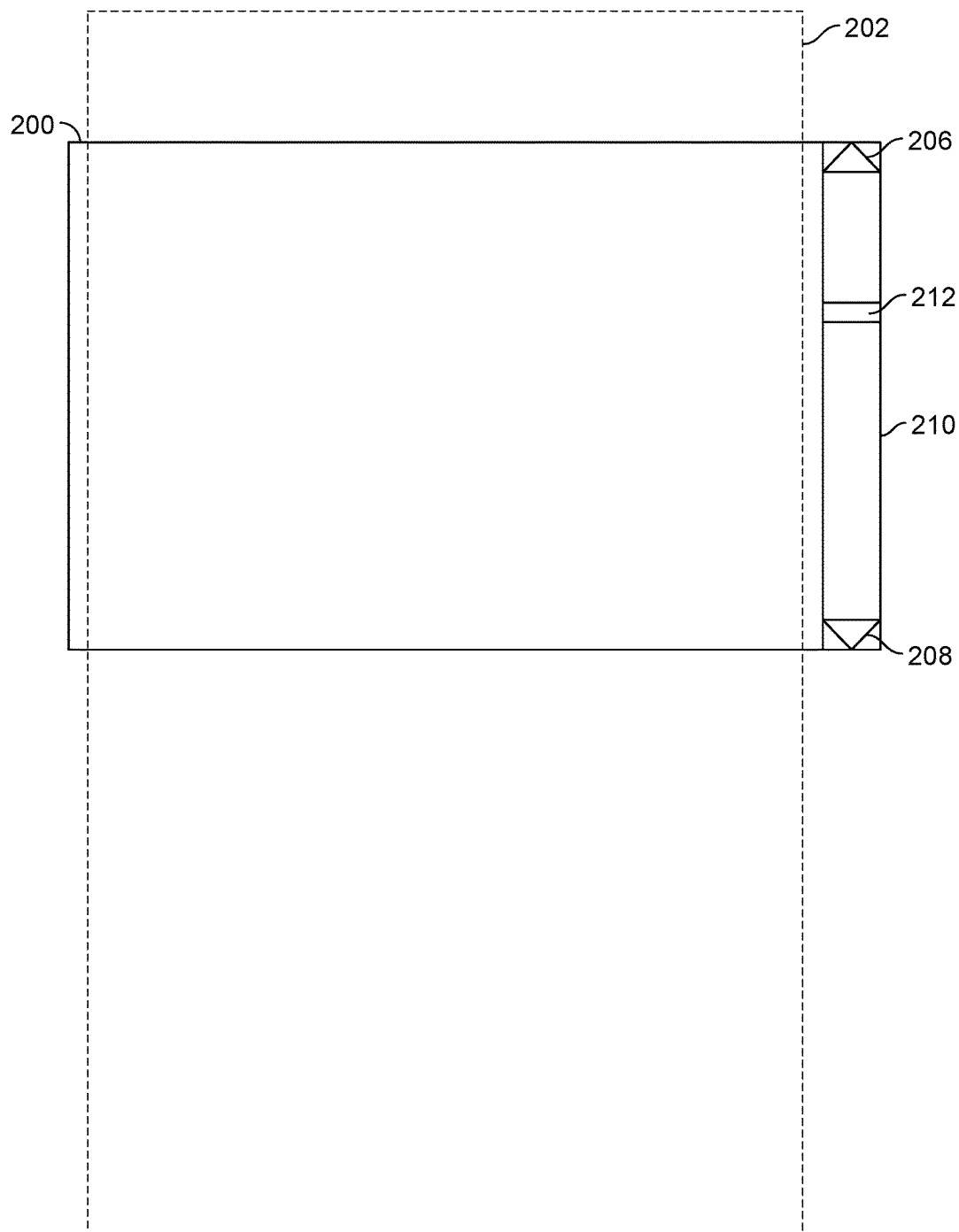
FIG. 2A is a diagram illustrating an embodiment of a system for causing a display of items in a display range.

FIG. 2A is a diagram illustrating an embodiment of a system for causing a display of items in a display range. In the example shown, a list of items 202 spans a total data height larger than display range 200, with a portion of the list displayed in display range 200. A user is able to select, using scroll bar 210, a selected position using scroll marker 212. Arrow 206 and arrow 208 enable a user to indicate rapid scrolling up and down, respectively.

Figure 2B:
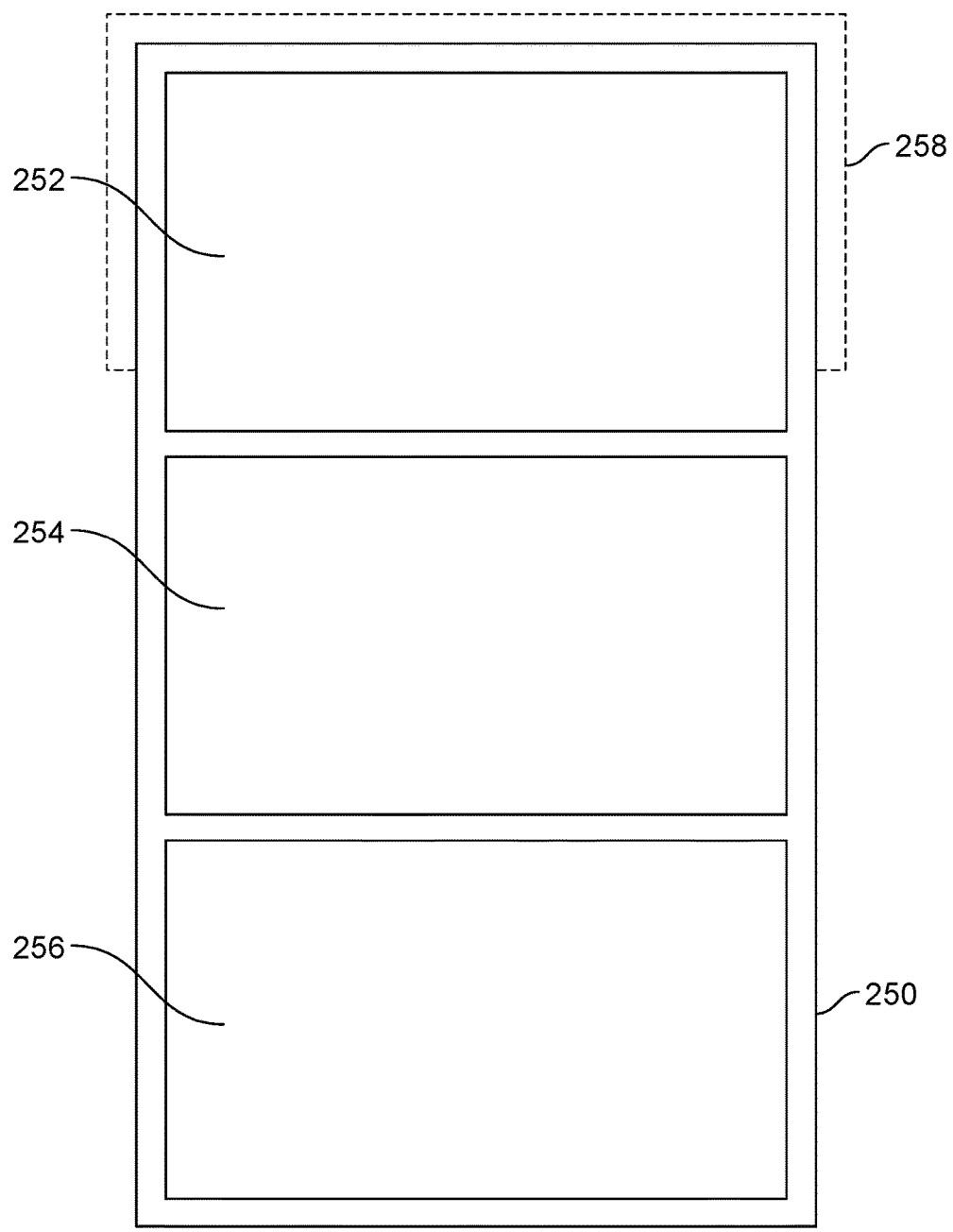
FIG. 2B is a diagram illustrating an embodiment of a system for causing a display of items in a display range.

FIG. 2B is a diagram illustrating an embodiment of a system for causing a display of items in a display range. In the example shown, data set list 250 is divided into chunks (e.g., chunk 252, chunk 254, chunk 256). Screen 258 when displaying data set list 250 shows a portion of data set list 250. In various embodiments, screen 258 displays the portion of data set list 250 using items in a portion of a chunk, items in two chunks, items in three chunks, items in a plurality of chunks, or any other appropriate mapping of items in chunk(s) and screen 258 display of data set list 250.

Figure 3:
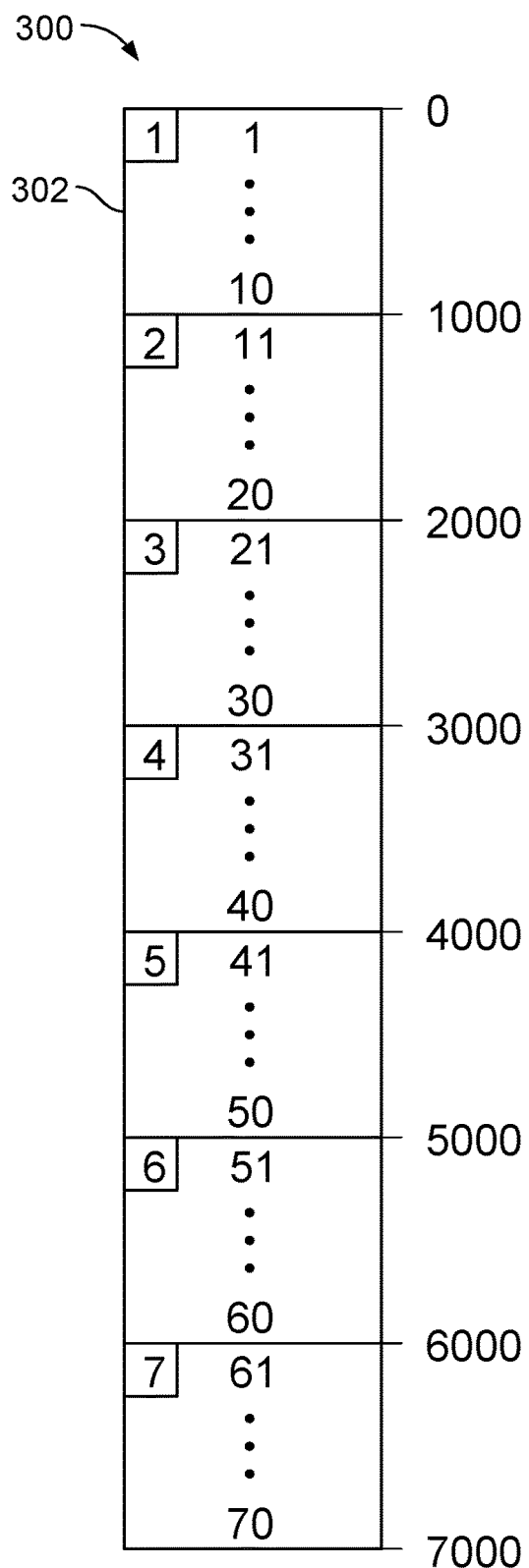
FIG. 3 is a diagram illustrating an embodiment of a system for causing a display of items in a display range.

FIG. 3 is a diagram illustrating an embodiment of a system for causing a display of items in a display range. In the example shown, a list of items 300 is separated into a set of chunks 302 (e.g., chunk 1 with items 1-10, chunk 2 with items 11-20, chunk 3 with items 21-30, chunk 4 with items 31-40, chunk 5 with items 41-50, chunk 6 with items 51-60, and chunk 7 with items 61-70). Chunks have a stored start position (e.g., chunk 1 has start position 0, chunk 2 has start position 1000, chunk 3 has start position 2000, chunk 4 has start position 3000, chunk 5 has start position 4000, chunk 6 has start position 5000, and chunk 7 has start position 6000). Chunk start positions are initially estimated using an estimated item height (e.g., 100 pixels) times the number of items in a chunk. Chunks have a stored initial height (e.g., 1000 initially) estimated as estimated item height times number of items in the chunk), which are updated as a chunk is rendered.

Figure 4:
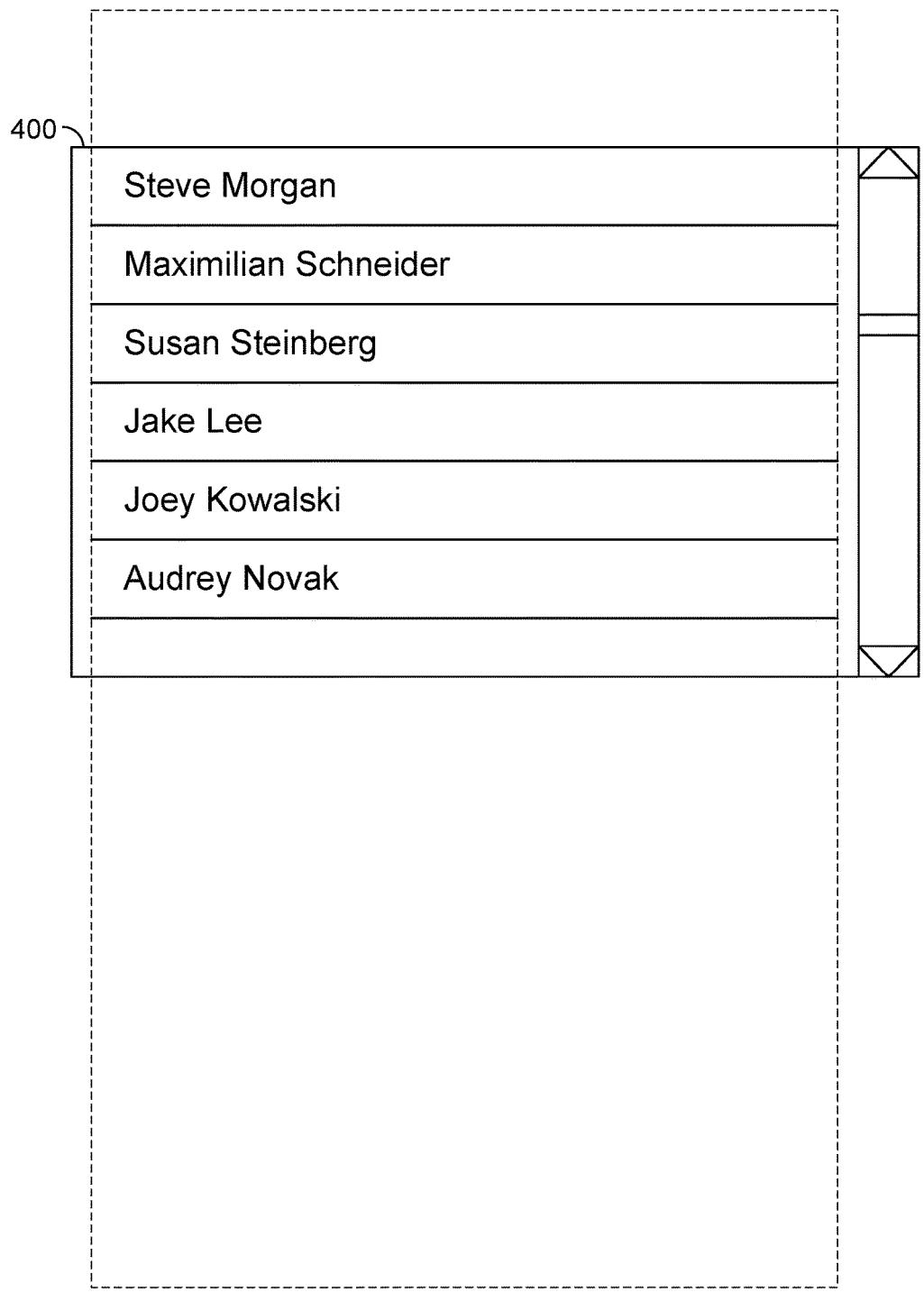
FIG. 4 is a diagram illustrating an embodiment of a system for causing a display of items in a display range.

FIG. 4 is a diagram illustrating an embodiment of a system for causing a display of items in a display range. In the example shown, a list of items spans a total data height larger than display range 400, with a portion of the list displayed in display range 400. A user is able to select, using scroll bar, a selected position using a scroll marker. Up arrow and down arrow enable a user to indicate rapid scrolling up and down, respectively. Display range 400 displays 6 items associated with a name data as an example of list data. List entry comprises Steve Morgan, Maximillian Schneider, Susan Steinberg, Jake Lee, Joey Kowalski, and Audrey Novak.

Figure 5:
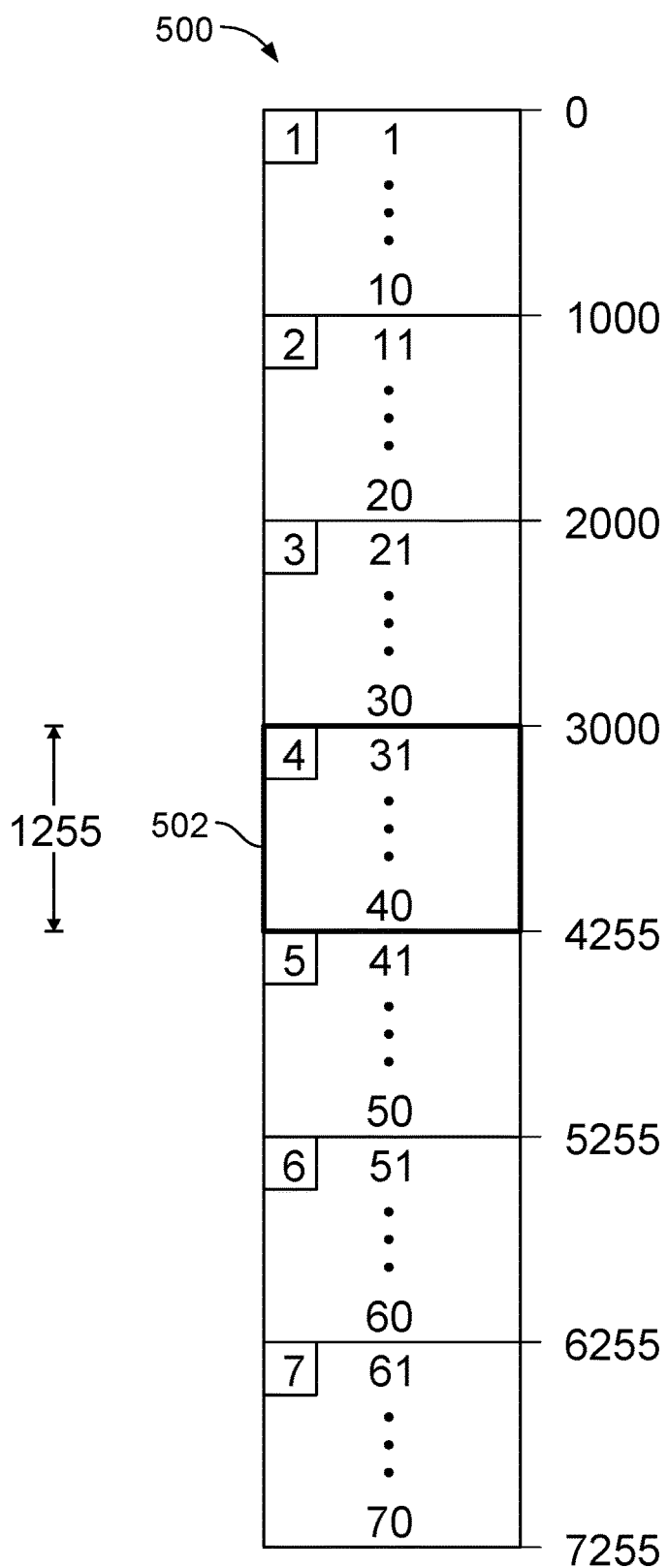
FIG. 5 is a diagram illustrating an embodiment of a system for causing a display of items in a display range.

FIG. 5 is a diagram illustrating an embodiment of a system for causing a display of items in a display range. In the example shown, a list of items 500 is separated into a set of chunks (e.g., chunk 1 with items 1-10, chunk 2 with items 11-20, chunk 3 with items 21-30, chunk 4 with items 31-40, chunk 5 with items 41-50, chunk 6 with items 51-60, and chunk 7 with items 61-70). Chunk 4 is determined as corresponding to a selected display range. Items are requested for display and rendered. The rendered height is 1255. The starting points for all chunks below the rendered chunk are updated (e.g., chunk 5 is updated to 4255, chunk 5 is updated to 4255, chunk 6 is updated to 5255, and chunk 6 is updated to 6255). Chunks have a stored start position (e.g., chunk 1 has start position 0, chunk 2 has start position 1000, chunk 3 has start position 2000, chunk 4 has start position 3000). Chunk start positions are initially estimated using an estimated item height (e.g., 100 pixels) times the number of items in a chunk. Chunks have a stored height (e.g., 1000 initially estimated as estimated item height times number of items in the chunk).

Figure 6:
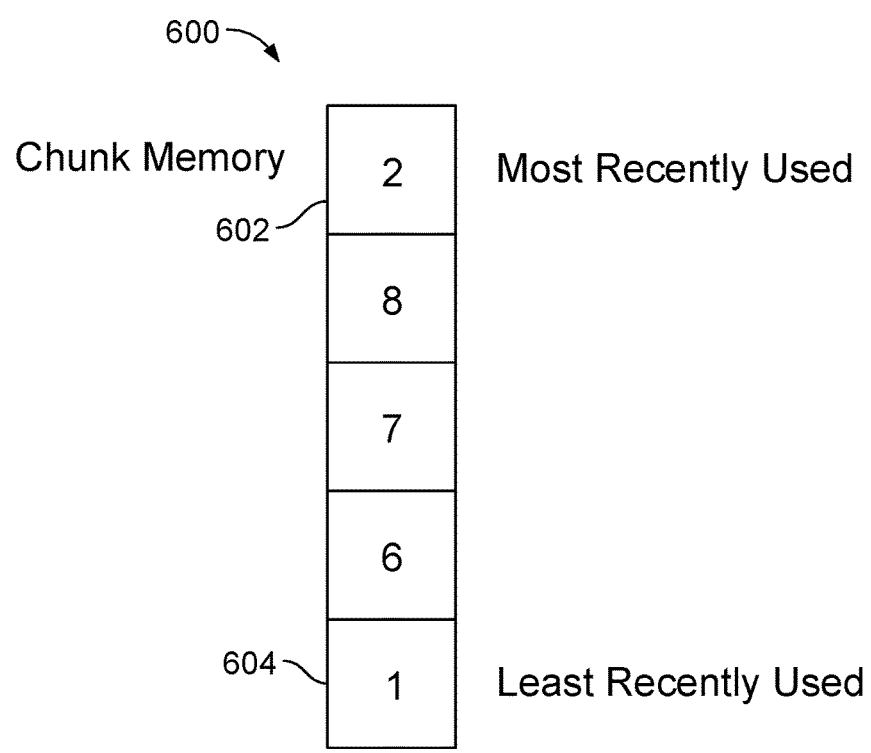
FIG. 6 is a diagram illustrating an embodiment of a chunk memory.

FIG. 6 is a diagram illustrating an embodiment of a chunk memory. In the example shown, chunk memory 600 includes a most recently used location 602 and a least recently used location 604 (e.g., in FIG. 6 showing holding chunk 2 and chunk 1, respectively). In between the most recently used location 602 and the least recently used location 604, there are a plurality of slots for chunks in the chunk memory (e.g., in FIG. 6 showing holding chunk 8, chunk 7, and chunk 6 in the 3 slots between most recently used and least recently used). In various embodiments, the chunk memory has a fixed number of slots (e.g., 1, 2, 3, 4, 5, 6, 7, 8, 9, 10, etc.), a variable number of slots, or any other appropriate number of slots.

Figure 7:
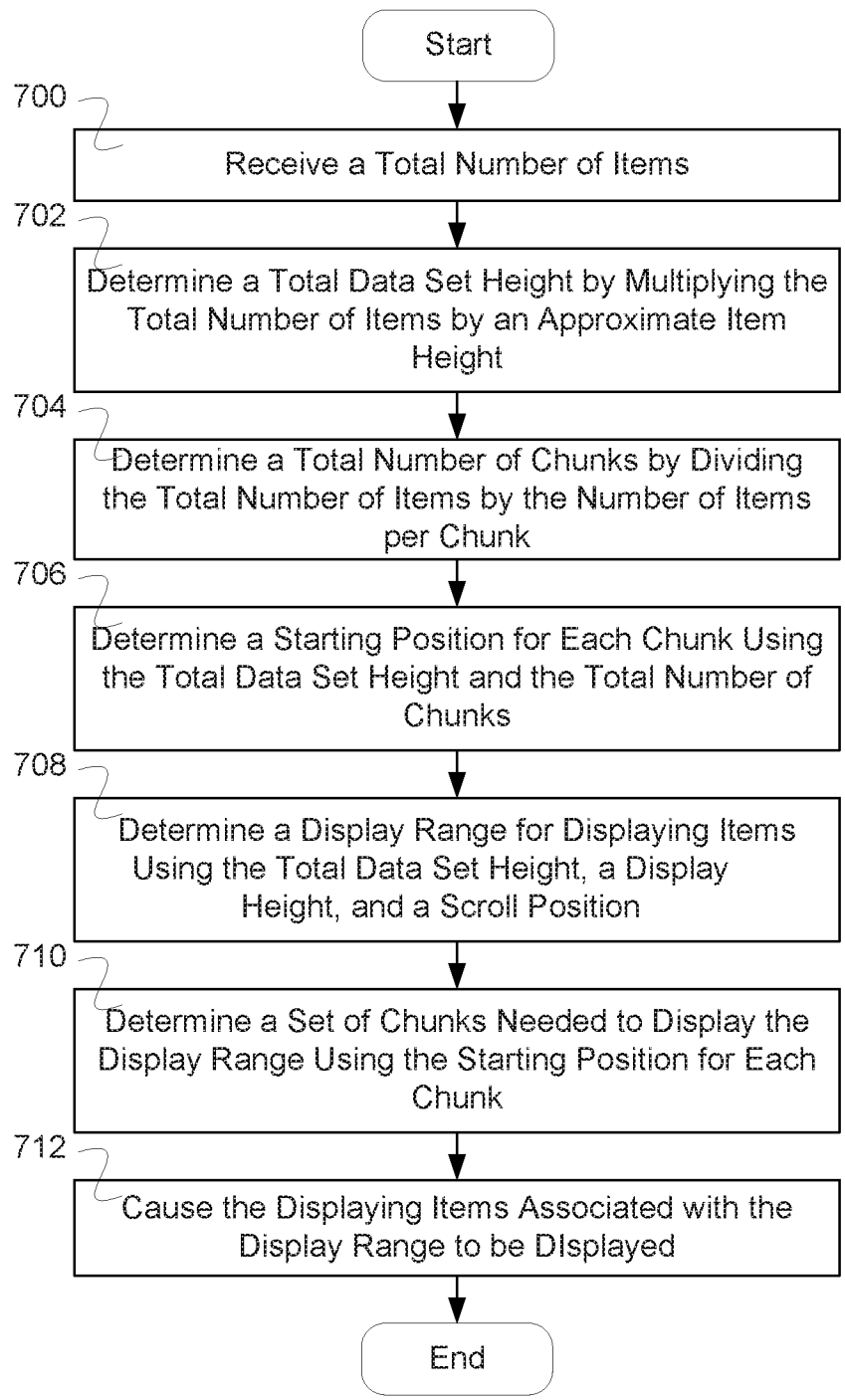
FIG. 7 is a flow diagram illustrating an embodiment of a process for causing a display of items in a display range.

FIG. 7 is a flow diagram illustrating an embodiment of a process for causing a display of items in a display range. In the example shown, in 700 a total number of items is received. For example, a total number of items in a data set list is received (e.g., 500 items). In some embodiments a first chunk is received. In 702, a total data set height is determined by multiplying the total number of items by an approximate item height. For example, a total number of items 500 is multiplied by an approximate item height of 20 pixels to give a total data set height of 10,000 pixels. For another example, a total number of items of 70 is multiplied by an approximate item height of 100 pixels to give a total data set height of 7000. In various embodiments, the approximate item height comprises 20 pixels, 30 pixels, or any other appropriate display height. In 704, a total number of chunks is determined by dividing the total number of items by the number of items per chunk. For example, say 500 items divided by 50 items per chunk to give 10 total chunks. For another example, 70 total items divided by 10 items per chunk to give 7 chunks. In various embodiments, the number of items per chunk is predetermined, is determined dynamically from the total number of items, or is determined in any other appropriate manner. In 706, a starting position for each chunk is determined using the total data set height and the total number of chunks. For example, for an approximate row height of 20 pixels multiplied by the number of 50 items per chunk or 1000 pixels per chunk—chunk 1 starts at pixel 0, chunk 2 starts at pixel 1000, chunk 3 starts at 2000, chunk 4 starts at 3000, chunk 5 starts at 4000, chunk 6 starts at 5000, chunk 7 starts at 6000, chunk 8 starts at 7000, chunk 9 starts at 8000, and chunk 10 starts at 9000. For another example, for an approximate row height of 100 pixels with 10 items per chunk or 1000 pixels per chunk—chunk 1 starts at pixel 0, chunk 2 starts at pixel 1000, chunk 3 starts at 2000, chunk 4 starts at 3000, chunk 5 starts at 4000, chunk 6 starts at 5000, and chunk 7 starts at 6000. In some embodiments, the chunks are one after another. In some embodiments, a start position of a chunk is stored in memory. In some embodiments, the height of a chunk is stored in memory. In various embodiments, a start position and a height are stored using one or more of the following: a starting position of the chunk and a height of the chunk, a starting position of the chunk and the ending position of the chunk, an ending position of the chunk and a height of the chunk, or any other appropriate manner of storing where the chunk is and what its span is. In 708, a display range is determined for displaying items using the total data set height and the display height, and a scroll position. For example, a display range is determined using a scroll bar position and a display screen height (e.g., it is determined from the scroll mechanism position that pixels 1000 through 1768 are the display range). In 710, a set of chunks needed to display the display range is determined using the starting position for each chunk. For example, the display range is used along with the start positions of the chunks to determine one or more chunks required to display the items in the display range. In some embodiments, in the event the set of chunks are already in memory, the chunks or the items in the chunks do not need to be requested. In some embodiments, the set of items corresponding to the set of chunks is requested and received. In some embodiments, the set of items are stored in memory slots corresponding to an associated chunk. In 712, the displaying items associated with the display range are caused to be displayed.

In some embodiments, once the items of a chunk are received and rendered a true height for the chunk is determined. The true height is used to update the stored height of the chunk and the starting positions of each chunk below the chunk. The total data height is also updated and stored.

In some embodiments, the set of chunks determined to be needed to display items in the display range are stored in a chunk memory. In some embodiments, chunks are removed from memory to make space for the new set of chunks. In some embodiments, chunks are removed in order of oldest to newest to make space.

In some embodiments, a new chunk is loaded or requested or rendered only after a minimum time has elapsed and the chunk is still within the viewable area.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for causing a display of items in a display range, comprising:
    an input interface to receive a total number of items;
    a processor configured to:
        determine a total data set height by multiplying the total number of items by an approximate item height;
        determine a total number of chunks by dividing the total number of items by a number of items per chunk;
        determine a starting position and a height for each chunk using the total data set height and the total number of chunks;

determine a display range for displaying items using the total data set height, a display height, and a scroll position;

determine a set of chunks needed to display the display range using the starting position for each chunk; and cause the displaying items associated with the display range to be displayed.

2. A system of claim 1, wherein the input interface is to receive a chunk.

3. A system of claim 2, wherein the chunk comprise a first chunk.

4. A system of claim 2, wherein the chunk is rendered.

5. A system of claim 4, wherein a true height of the chunk is determined based on rendering the chunk.

6. A system of claim 5, wherein the height of the chunk is updated.

7. A system of claim 5, wherein a set of starting positions are updated for all chunks below the chunk.

8. A system of claim 1, wherein the display range for displaying items is determined based on a scrolling mechanism.

9. A system of claim 8, wherein a second display range for displaying items is determined based on the scrolling mechanism.

10. A system of claim 9, wherein a second set of chunks needed to display the second display range for displaying items is determined using the starting position for each chunk.

11. A system of claim 9, wherein a loaded chunk is removed from a memory to maintain a constant number of chunks in the memory.

12. A system of claim 8, wherein a chunk of the set of chunks is loaded in the event that a delay time has elapsed and the chunk of the set of chunks has not moved outside the display range.

13. A system of claim 1, wherein the total number of items comprises a total number of items in a list.

14. A system of claim 13, wherein the displaying items comprises a subset of the list associated with the display range.

15. A system of claim 1, wherein the processor is further configured to store the starting position and the height for each chunk.

16. A method of causing a display of items in a display range, comprising:

receiving a total number of items;

determining, using a processor, a total data set height by multiplying the total number of items by an approximate item height;

determining a total number of chunks by dividing the total number of items by a number of items per chunk;

determining a starting position and a height for each chunk using the total data set height and the total number of chunks;

determining a display range for displaying items using the total data set height and a display height, and a scroll position;

determining a set of chunks needed to display the display range using the starting position for each chunk; and causing the displaying items associated with the display range to be displayed.

17. A computer program product for causing a display of items in a display range, the computer program product being embodied in a non-transitory computer readable storage medium and comprising computer instructions for:

receiving a total number of items;

determining, using a processor, a total data set height by multiplying the total number of items by an approximate item height;

determining a total number of chunks by dividing the total number of items by a number of items per chunk;

determining a starting position and a height for each chunk using the total data set height and the total number of chunks;

determining a display range for displaying items using the total data set height and a display height, and a scroll position;

determining a set of chunks needed to display the display range using the starting position for each chunk; and causing the displaying items associated with the display range to be displayed.

18. A system for causing a display of items in a display range, comprising:

a processor to:

display a data set by dividing the data set into chunks, each loaded in the event that a chunk is within a viewable area, comprising:

storing a starting position and a height for each chunk;

updating a starting position for all chunks below an updated chunk, wherein the updated chunk has a height that is updated.

19. A system of claim 18, wherein the chunk is removed from a memory to maintain a constant number of chunks in a memory.

20. A system of claim 18, wherein the chunk is loaded in the event that a delay time has elapsed and the chunk has not moved outside the viewable area.

* * * * *